United States Patent
Sauler et al.

(10) Patent No.: US 7,246,599 B2
(45) Date of Patent: Jul. 24, 2007

(54) METHOD FOR DETERMINING THE IGNITION ANGLE

(75) Inventors: Juergen Sauler, Stuttgart (DE); Johann Konrad, Tamm (DE); Axel Heinstein, Wimsheim (DE); Martin Vollmer, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/537,949

(22) PCT Filed: Jul. 17, 2003

(86) PCT No.: PCT/DE03/02407

§ 371 (c)(1),
(2), (4) Date: Dec. 30, 2005

(87) PCT Pub. No.: WO2004/053328

PCT Pub. Date: Jun. 24, 2004

(65) Prior Publication Data

US 2006/0124107 A1  Jun. 15, 2006

(30) Foreign Application Priority Data

Dec. 12, 2002  (DE)  ................................. 102 57 994

(51) Int. Cl.
F02P 5/00 (2006.01)
F02M 7/00 (2006.01)

(52) U.S. Cl. ............................. 123/406.23; 123/406.33

(58) Field of Classification Search .......... 123/406.23, 123/406.26, 406.29, 406.33, 436
See application file for complete search history.

(56) References Cited

U.S. PATENT DOCUMENTS

| 5,140,962 | A | * | 8/1992 | Iwata ..................... 123/406.35 |
| 5,411,000 | A | | 5/1995 | Miyashita et al. |
| 5,577,476 | A | | 11/1996 | Iyoda |
| 5,992,385 | A | * | 11/1999 | Hess et al. ............. 123/406.23 |
| 6,161,523 | A | | 12/2000 | Unland et al. |
| 6,283,093 | B1 | * | 9/2001 | Lautenschuetz et al. ..................... 123/406.33 |
| 6,513,495 | B1 | * | 2/2003 | Franke et al. .......... 123/406.29 |
| 6,752,123 | B2 | * | 6/2004 | Unger et al. ................. 123/305 |
| 6,814,054 | B2 | * | 11/2004 | Sauler et al. .......... 123/406.21 |

FOREIGN PATENT DOCUMENTS

WO  WO 02/20964  3/2002

* cited by examiner

*Primary Examiner*—John T. Kwon
(74) *Attorney, Agent, or Firm*—Kenyon & Kenyon LLP

(57) ABSTRACT

A method for determining the ignition angle is provided, in which modifications of manipulated variables which have an influence on the knock limit, and therefore on the optimum ignition angle as well, are dynamically taken into account. To this end, a base ignition angle is first determined, based on the instantaneous engine speed and load. As part of a downstream knock control, a first ignition angle adjustment in the retard direction is determined when knocking has been detected. As part of a knock limit control, a second ignition angle adjustment is also determined when at least one manipulated variable influencing the knock limit changes, with the type of the second ignition angle adjustment, i.e., advancing or retarding, depending on the manipulated variable and its modification.

14 Claims, 2 Drawing Sheets

METHOD FOR DETERMINING THE IGNITION ANGLE

FIELD OF THE INVENTION

The present invention relates to a method for determining the ignition angle for an internal combustion engine, in which a base ignition angle is determined based on the instantaneous engine speed and load, and as part of a downstream knock control, a first ignition angle adjustment in the retard direction is determined when knocking has been detected.

BACKGROUND INFORMATION

In the development of internal combustion engines, the issues of fuel consumption and exhaust gas emission limits are assuming increasing importance. These operating parameters may be influenced by various measures or manipulated variables, for example exhaust gas recirculation, moving the charge motion control valve, adjusting the camshaft, modifying the valve train, and/or regulating the engine temperature, or regulating the coolant temperature and/or the coolant flow rate. All these manipulated variables also have an influence on the knock limit of the engine, and therefore on the optimum ignition angle as well.

For this reason, the base ignition angle is determined in practice in multiple steps. Based on the instantaneous engine speed and load, an initial ignition angle is first determined. This initial ignition angle is usually read out from an appropriate characteristic map. To determine the base ignition angle, an ignition angle offset is then added to the initial ignition angle for each manipulated variable, i.e., for each of the above-mentioned functionalities, to enable operation of the engine under all operating conditions at the most optimum efficiency. The ignition angle offsets for the individual manipulated variables are usually determined from appropriate characteristic maps as well. The base ignition angle thus determined forms the starting point for a downstream cylinder-specific knock control, thereby allowing retardation of the base ignition angle when knocking has been detected.

In practice, the above-described method has proven to be problematic in several respects. For manipulated variables which are calculated using a model, dynamic changes frequently result in errors in determining the manipulated variable. This results in erroneous mapping to the corresponding characteristic map for the ignition angle offset, and thus results in less than optimum determination of the base ignition angle. The exhaust gas recirculation rate and the engine temperature are examples of manipulated variables which may be calculated using a model. The model calculations for determining the engine temperature under alternating load or a change in the coolant flow rate and/or coolant temperature have often proven to be inaccurate. One reason is the slow transient phenomena which occur during temperature changes. In addition, changes in the coolant flow rate have a strong non-linear effect on the component or engine temperature. It is possible that the known ignition angle pilot control may not take these circumstances into consideration.

As previously stated, in the known ignition angle pilot control each manipulated variable requires its own characteristic map for the corresponding ignition angle offset. As a consequence, the complexity of data recording and storage increases with the number of manipulated variables to be considered. Data recording for characteristic maps is susceptible to errors based on the sheer quantity of data alone. Furthermore, in some cases data recording is also very time-intensive, such as in the case of the ignition angle offset resulting from dynamic changes in the engine temperature, or the coolant flow rate and the coolant temperature.

SUMMARY

The present invention provides a method for determining the ignition angle, whereby modifications of manipulated variables which have an influence on the knock limit, and thus on the optimum ignition angle, are dynamically taken into account.

This is achieved according to the present invention by the fact that as part of a knock limit control a second ignition angle adjustment is determined when at least one manipulated variable influencing the knock limit changes, with the type of the second ignition angle adjustment, i.e., advancing or retarding, depending on the manipulated variable and its modification.

In the method according to the present invention, the knock limit control is triggered by modifications of the manipulated variables to be taken into account. The absolute value of the manipulated variable is not relevant, so that a manipulated variable determined in error does not have a negative effect on the ignition angle determination according to the present invention as long as the modification of the manipulated variable is correctly detected. In addition, in the method according to the present invention, no characteristic maps are required for determining manipulated variable-dependent ignition angle offsets. As a result, the intensive time and memory requirements associated with data recording for such characteristic maps, as well as the risk of error caused by data recording for these characteristic maps, are not applicable. With the assistance of knock limit control, the engine is operated at an optimum ignition angle, either at the knock limit or with an ignition angle specified by the torque structure.

In the method according to the present invention, a clear distinction is made between the known knock control and the knock limit control according to the present invention. Thus, the functionality of the knock control is fully maintained. Aside from several additional release or blocking conditions, to which reference is made in one exemplary embodiment described below, it is possible for the individual functions of the known knock control to be implemented unchanged. In particular, a stationary adaptation of the knock control, which occurs when the engine operating point changes rapidly, may continue unimpaired.

There are several possibilities for implementing the method according to the present invention, and in particular for implementing the knock limit control. For example, this may be achieved in the same manner as for knock control, on an individual cylinder basis. In one implementation of the method of the present invention, however, the knock limit control is carried out for all cylinders in the internal combustion engine at the same time and in the same manner. The resulting global adjustment of the ignition angle allows a particularly rapid and efficient adaptation of the ignition angle to a modified knock limit. The ignition angle is regulated on an individual cylinder basis with the assistance of knock control, which is performed in parallel with the knock limit control. In this regard, it should be noted that the ignition angle may be retarded as well as advanced as part of knock limit control, whereas knock control is only able to retard the ignition angle.

In the operation of a motor vehicle, situations may arise in which the ignition angle is specified only by the torque structure, and therefore the ignition angle is independent of the knock control and knock limit control provided by the present invention. Switching on the air conditioner compressor is an example. To avoid jerking of the engine in this case, the torque structure of the engine may form a torque derivative. The ignition angle is thus retarded. During the torque intervention, neither the first ignition angle adjustments determined in the knock control nor the second ignition angle adjustment made in the knock limit control come into use, so that the knock limit control must be interrupted during the torque intervention. After such a torque intervention, the torque derivative is again removed, for example by the ignition angle being ramped up to the knock limit. To determine the appropriate ignition angle, a base ignition angle is first determined, based on the instantaneous engine speed and load, to which an ignition angle adjustment is then added to the knock limit control. The ignition angle adjustment may be determined before the torque intervention, i.e., before the knock limit control is interrupted. However, the thus determined ignition angle represents a good approach to the knock limit only if none of the manipulated variables which influence the knock limit has changed during the torque intervention.

One example implementation of the method according to the present invention concerns the case of ignition angle adjustment after a torque intervention, at least one manipulated variable influencing the knock limit having changed during the torque intervention. According to the present invention, the value of the ignition angle adjustment for the knock limit control is read out from a characteristic map in which values for this ignition angle adjustment are stored as a function of the engine speed, the load, and the modified manipulated variable. In the ignition angle adjustment, changes in the manipulated variables thus may also be taken into account after a torque intervention, even though the knock limit control was interrupted during the torque intervention.

The values stored in such a characteristic map may be adaptively determined during normal operation of the knock limit control. To this end, initial values for an adaptive characteristic map need be determined only once, and the characteristic map may then be used as an initial characteristic map for all engines of a given type.

DETAILED DESCRIPTION

Figure 1:
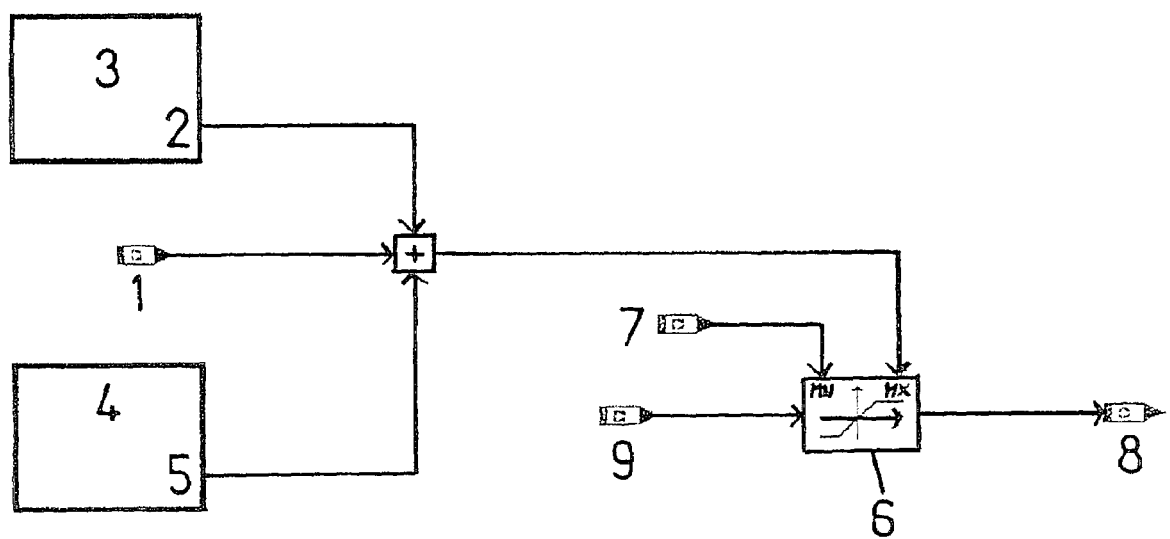
FIG. 1 shows a block diagram illustrating the method of the present invention for adjusting the ignition angle during normal engine operation.

A base ignition angle 1 is determined according to the method of the present invention for determining the ignition angle for an internal combustion engine, based on the instantaneous engine speed and the load. Base ignition angle 1 may be determined using an appropriate characteristic map, for example. A first ignition angle adjustment 2, which is determined as part of a cylinder-specific knock control 3 when knocking has been detected for a cylinder in the internal combustion engine, is then added to this base ignition angle 1. It is possible for knock control 3 to only cause a retardation of base ignition angle 1. According to the present invention, a second ignition angle adjustment 5 may be determined as part of a knock limit control 4 when at least one manipulated variable changes which influences the knock limit.

Knock limit control 4 may, for example, be actuated by a change in the exhaust gas recirculation rate, an adjustment of the camshaft, the opening or closing of the charge motion control valve, a modification of the valve train, or also by a change in the engine temperature, or a change in the coolant temperature or coolant flow rate. With the assistance of knock limit control 4, the ignition angles are very quickly adapted to the modified knock limit. In one example implementation of the method according to the present invention, the ignition angles are adjusted globally, i.e., for all cylinders at the same time and in the same manner. Thus, in this instance, only one value is determined for the second angle adjustment 5 as part of knock limit control 4.

In the example implementation of the method illustrated in FIG. 1, knock limit control 4 is carried out in parallel with knock control 3, so that the functionality of knock control 3 is independent of knock limit control 4.

Whether the second ignition angle adjustment 5 determined as part of knock limit control 4 results in an advance or a retardation of base ignition angle 1 depends on the manipulated variable which triggers knock limit control 4, and by the manner in which this manipulated variable is modified.

When the exhaust gas recirculation rate increases, or when the engine temperature decreases, knock limit control 4 causes a global advance of base ignition angle 1 as long as knock control 3 has detected knocking. In this case, knock control 3 remains active and causes the ignition angle for the knocking cylinder to be retarded. If the causative manipulated variable changes further, i.e., if the exhaust gas recirculation rate continues to increase or the engine temperature drops further because the coolant flow rate is increasing or the coolant temperature is decreasing, the ignition angle is further advanced globally after an applicable time until knocking is detected.

If the exhaust gas recirculation rate decreases or the engine temperature rises, knock limit control 4 causes a global retardation of base ignition angle 1 for each knocking instance detected. In this case, both cylinder-specific knock control 3 and a stationary adaptation of the ignition angle are blocked. A simultaneous lowering of the knock detection limit triggers retardation of the ignition angle, even for very minor knocking.

The sum of base ignition angle 1, first ignition angle adjustment 2, and second ignition angle adjustment 5 forms the maximum value of a limiter 6, with the latest possible ignition angle 7 being specified as a minimum value for limiter 6. With the assistance of limiter 6, an actual ignition angle 8 is determined by the fact that the range of values of a setpoint ignition angle 9 is delimited.

Figure 2:
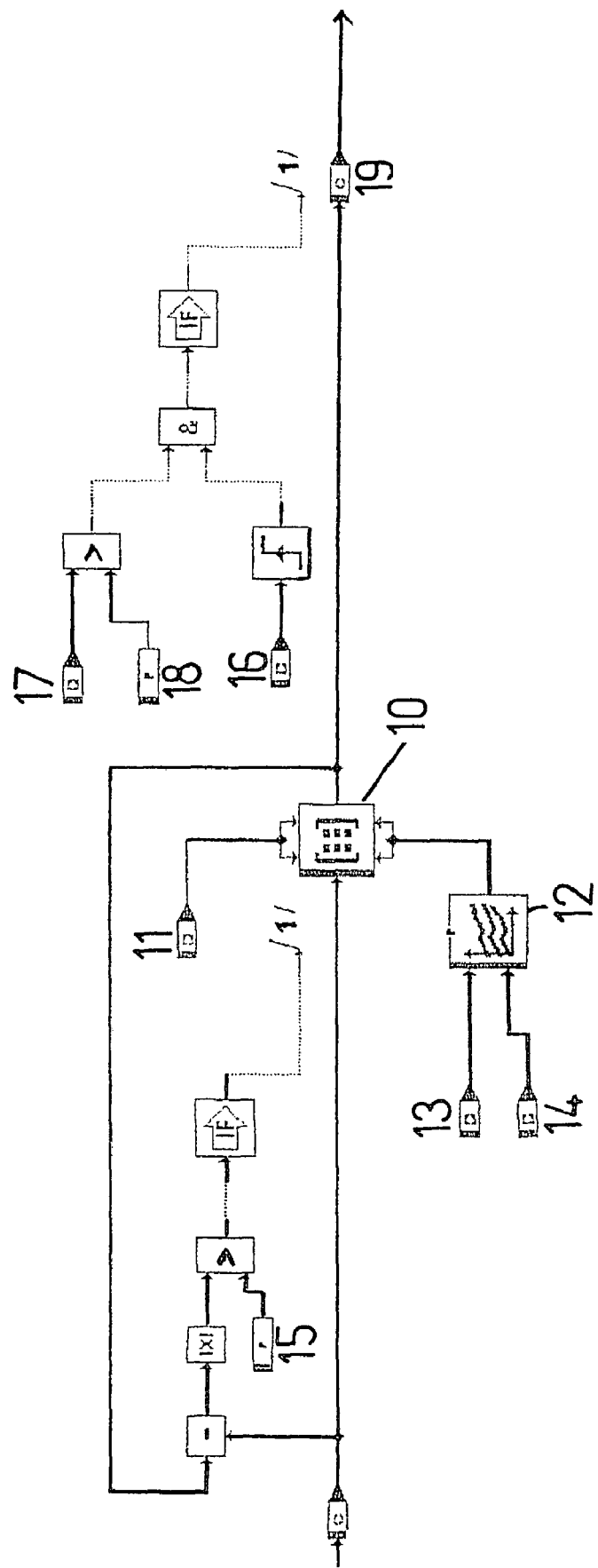
FIG. 2 shows a block diagram illustrating an adaptive characteristic map for knock limit control and for reading out the values from this adaptive characteristic map.

The block diagram illustrated in FIG. 2 concerns the determination of the ignition angle according to the method of the present invention after a torque intervention. When a torque intervention occurs, the ignition angles are specified by the torque structure of the engine. The knock limit control is interrupted. As explained in conjunction with FIG. 1, a base ignition angle based on the instantaneous engine speed and load is determined, even after one torque intervention. An ignition angle adjustment in which the influences of one or multiple manipulated variables on the knock limit are taken into account is then added to this base ignition angle. During normal engine operation, this ignition angle adjustment is determined as part of the knock limit control, which, however, is actuated only when one or multiple manipulated variables change(s). Only if none of the manipulated variables has changed during the torque intervention is it possible to approach the knock limit, using the value for the ignition angle adjustment which has been determined before the knock limit control was interrupted. Otherwise, the output ignition angle is either too advanced, resulting in knocks, or too retarded, resulting in a loss of efficiency.

In one example implementation of the method according to the present invention, the value for the ignition angle adjustment for knock limit control is read out from a characteristic map when at least one manipulated variable influencing the knock limit has changed during the torque intervention. Values for the ignition angle adjustment are stored in this characteristic map as a function of the engine speed, the load, and the modified manipulated variable.

The condition for reading out a value from such a characteristic map 10 is represented in the right portion of the block diagram illustrated in FIG. 2. The left portion of the block diagram concerns the data recording for this characteristic map 10, which in this instance is performed adaptively during normal operation of the knock limit control. Characteristic map 10 is therefore referred to below as an adaptive characteristic map.

Values are mapped to adaptive characteristic map 10 for both the description and the readout via the manipulated variable, in this case exhaust gas recirculation rate 11, and via interpolation points 12 as a function of engine speed 13 and load 14. During normal engine operation, each value of the ignition angle adjustment which has been determined as part of the knock limit control is compared to the corresponding value in adaptive characteristic map 10. Only when the difference between these two values exceeds an applicable threshold 15 is the corresponding value in adaptive characteristic map 10 overwritten by the instantaneously determined value for the ignition angle adjustment.

As previously stated, two conditions must be satisfied for reading out a value from adaptive characteristic map 10. First, the torque intervention which has caused the knock limit control to be interrupted must be terminated, which is checked at 16. Second, in the illustrated exemplary embodiment the exhaust gas recirculation rate must have significantly changed during the torque intervention. To this end, the difference between the exhaust gas recirculation rate before the torque intervention and the exhaust gas recirculation rate after torque intervention 17 is compared to a predetermined threshold value 18. Only when both conditions have been satisfied is an adapted ignition angle adjustment 19 read out from adaptive characteristic map 10. The ignition angle adjustment may subsequently be predetermined with sufficient accuracy as part of the knock limit control.

What is claimed is:

1. A method for determining an ignition angle for an internal combustion engine, comprising:
   determining a base ignition angle based on instantaneous engine speed and load;
   determining, as part of a downstream knock control, a first ignition angle adjustment in a retarding direction when knocking has been detected;
   determining, as part of a knock limit control, a second ignition angle adjustment when at least one manipulated variable influencing a knock limit changes, wherein the second ignition angle adjustment is in one of an advancing direction and a retarding direction, depending on the at least one manipulated variable and a change in the at least one manipulated variable; and
   adding the base ignition angle, the first ignition angle adjustment, and the second ignition angle adjustment to form a maximum value for adjustment of the ignition angle.

2. The method as recited in claim 1, wherein the knock limit control is performed for all cylinders in the internal combustion engine at the same time and in the same manner.

3. The method as recited in claim 1, wherein the knock limit control is triggered by a change in an exhaust gas recirculation rate.

4. The method as recited in claim 1, wherein the knock limit control is triggered by an adjustment in a camshaft of the internal combustion engine.

5. The method as recited in claim 1, wherein the knock limit control is triggered by one of opening and closing of a charge motion control valve.

6. The method as recited in claim 1, wherein the knock limit control is triggered by a modification of a valve train.

7. The method as recited in claim 1, wherein the knock limit control is triggered by one of: a) a change in an engine temperature; and b) a change in at least one of a coolant temperature and a coolant flow rate.

8. The method as recited in claim 1, wherein the at least one manipulated variable is changed in such a way that the knock limit control advances the base ignition angle, and wherein the knock control remains active, and wherein the knock limit control advances the base ignition angle only until the knock control has detected a knock.

9. The method as recited in claim 1, wherein the at least one manipulated variable is changed in such a way that the knock limit control retards the base ignition angle for each knock detected, and wherein the ignition angle is not changed by the knock control and by a stationary adaptation during the knock limit control.

10. The method as recited in claim 9, wherein a knock detection limit is lowered.

11. The method as recited in claim 8, wherein an advance of the base ignition angle is determined in the knock limit control when at least one of: a) an exhaust gas recirculation rate increases; and b) an engine temperature decreases.

12. The method as recited in claim 9, wherein a retardation of the base ignition angle is determined in the knock limit control when at least one of: a) an exhaust gas recirculation rate decreases; and b) an engine temperature increases.

13. A method for adjusting an ignition angle of an engine upon a torque intervention, comprising:
   interrupting a knock limit control, wherein at least one manipulated variable influencing a knock limit is changed during the torque intervention;
   determining the ignition angle based on a torque structure of the engine, after the torque intervention; and
   obtaining a value for an ignition angle adjustment from a characteristic map, wherein the characteristic map stores a plurality of values for the ignition angle adjustment as a function of an engine speed, an engine load, and the changed at least one manipulated variable.

14. The method as recited in claim 13, wherein the plurality of values stored in the characteristic map are adaptively determined during normal operation of the knock limit control.

* * * * *